United States Patent
Zhang et al.

(10) Patent No.: US 10,203,233 B2
(45) Date of Patent: Feb. 12, 2019

(54) FLOW SENSING MODULE

(71) Applicant: Honeywell International Inc., Morris Plains, NJ (US)

(72) Inventors: Ruifeng Zhang, Morris Plains, NJ (US); Jamie Speldrich, Freeport, IL (US); ZhiKang Lan, Nanjing (CN); Ru Wang, Nanjing (CN)

(73) Assignee: Honeywell International Inc., Morris Plains, NJ (US)

(*) Notice: Subject to any disclaimer, the term of this patent is extended or adjusted under 35 U.S.C. 154(b) by 0 days.

(21) Appl. No.: 15/507,701

(22) PCT Filed: Aug. 29, 2014

(86) PCT No.: PCT/CN2014/085491
§ 371 (c)(1),
(2) Date: Feb. 28, 2017

(87) PCT Pub. No.: WO2016/029423
PCT Pub. Date: Mar. 3, 2016

(65) Prior Publication Data
US 2017/0292864 A1  Oct. 12, 2017

(51) Int. Cl.
*G01F 1/42* (2006.01)
*G01F 1/40* (2006.01)
(Continued)

(52) U.S. Cl.
CPC ............... *G01F 1/42* (2013.01); *G01F 1/40* (2013.01); *G01F 1/6842* (2013.01);
(Continued)

(58) Field of Classification Search
CPC ..... G01F 1/42; G01F 1/68; G01F 5/00; G01F 1/28; G01F 1/00
See application file for complete search history.

(56) References Cited

U.S. PATENT DOCUMENTS 5,750,892 A  5/1998  Huang et al.
6,601,460 B1  8/2003  Matema
(Continued)

FOREIGN PATENT DOCUMENTS

CN  102288232 A  12/2011
CN  103674128 A  3/2014
(Continued)

OTHER PUBLICATIONS

International Search Report, PCT/US2014/085491, dated May 27, 2015, 3 pages.
(Continued)

*Primary Examiner* — Jewel V Dowtin
(74) *Attorney, Agent, or Firm* — Seager, Tufte & Wickhem LLP

(57) ABSTRACT

A flow sensing module is provided for determining a flow rate of a fluid flowing through a flow channel. The flow sensing module may include an integrated flow restrictor, sometimes including a plurality of concentric ribs defining a plurality of orifices shaped to match the curvature of the wall of the flow channel. A first sensing port may open into the flow channel upstream of the flow restrictor, and a second sensing port may open into the flow channel downstream of the flow restrictor. A flow rate of a fluid flowing through the flow channel may be determining using a differential pressure between the first and second ports created by the flow restrictor, either using a flow sensor or a pressure sensor. The particular arrangement and relative dimensions of the orifices of the flow restrictor and the pressure ports can result in substantially reduced noise.

20 Claims, 7 Drawing Sheets

(51) Int. Cl.
*G01F 1/684* (2006.01)
*G01F 5/00* (2006.01)
*G01L 19/00* (2006.01)

(52) U.S. Cl.
CPC .............. *G01F 1/6845* (2013.01); *G01F 5/00* (2013.01); *G01L 19/0007* (2013.01)

(56) References Cited

U.S. PATENT DOCUMENTS

| | | | | |
|---|---|---|---|---|
| 6,655,207 B1* | 12/2003 | Speldrich | .................. | G01F 1/40 73/202.5 |
| 7,454,984 B1* | 11/2008 | Ross | .................. | G01F 1/48 73/861.52 |
| 7,464,611 B2* | 12/2008 | Matter | .................. | G01F 1/6842 73/202 |
| 7,905,153 B2* | 3/2011 | Jasnie | .................. | F02M 35/024 73/861.24 |
| 8,826,731 B2* | 9/2014 | Speldrich | .................. | F17D 1/00 73/204.21 |
| 8,997,586 B2* | 4/2015 | Arnold | .................. | G01F 5/00 73/861.351 |
| 9,032,790 B2* | 5/2015 | Braun | .................. | G01F 1/6842 73/269 |
| 9,546,891 B1* | 1/2017 | Padden | .................. | G01F 1/10 |
| 2005/0039809 A1* | 2/2005 | Speldrich | .................. | G01F 1/40 138/39 |
| 2008/0250854 A1 | 10/2008 | Ding et al. | | |

FOREIGN PATENT DOCUMENTS

WO    0161282 A2    8/2001
WO    2016/029423 A1    3/2016

OTHER PUBLICATIONS

Written Opinion of the International Searching Authority, PCT/US2014/085491, dated May 27, 2015, 4 pages.

* cited by examiner

FLOW SENSING MODULE

CROSS-REFERENCE TO RELATED APPLICATIONS

This application claims priority as the National Stage of International Application No. PCT/CN2014/085491 filed on Aug. 29, 2014 and entitled FLOW SENSING MODULE, which is incorporated herein by reference in its entirety.

TECHNICAL FIELD

The present disclosure relates generally to flow sensing modules, and more particularly, to flow sensing modules that have a flow restrictor.

BACKGROUND

Flow rate control mechanisms are used in a wide variety of flow systems for controlling the amount of fluid, gaseous or liquid, traveling through the system. For example, a flow rate control mechanism may be used to affect chemical reactions by helping to ensure that proper feed stocks, such as catalysts and reacting agents, enter a processing unit at a desired flow rate. In another example, a flow rate control mechanism may be used to regulate flow rates in systems such as ventilators and respirators where, for example, it may be desirable to maintain a sufficient flow of breathable air or provide sufficient anesthetizing gas to a patient in preparation for surgery. In these and other applications, the flow rate control mechanism typically detects the flow of fluid traveling down a flow channel. It is desirable to reduce the noise associated with detecting the flow of fluid, particularly in low flow applications.

SUMMARY

The present disclosure relates generally to flow sensing modules, and more particularly, to flow sensing modules that have a flow restrictor.

In an illustrative embodiment, a flow module can include a housing having a wall defining a flow channel, wherein the flow channel has an inlet end and an outlet end. The flow module may also include a flow restrictor in the flow channel. The flow restrictor may have an inlet edge and an outlet edge, with a plurality of orifices extending between the inlet edge and the outlet edge. The flow module may further include a first port and a second port extending away from the housing and in fluid communication with the flow channel. The first port may open into the flow channel downstream of the inlet end of the flow channel and upstream of the inlet edge of the flow restrictor. The second port may open into the flow channel upstream of the outlet end of the flow channel and downstream of the outlet edge of the flow restrictor. In some cases, a distance from the first port to the inlet edge of the flow restrictor ranges from 1.0 mm to 3.0 mm, and a distance between the first port and the second port ranges from 12.0 mm to 16.0 mm. In some cases, at least one of the plurality of orifices extends along an inwardly facing flow channel wall of the housing, and has an orifice height in a direction perpendicular to the inwardly extending flow channel wall. In some cases, a distance from the first port to the inlet side of the flow restrictor may range from 50% to 200% of the orifice height. These are just some examples.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

Figure 1:
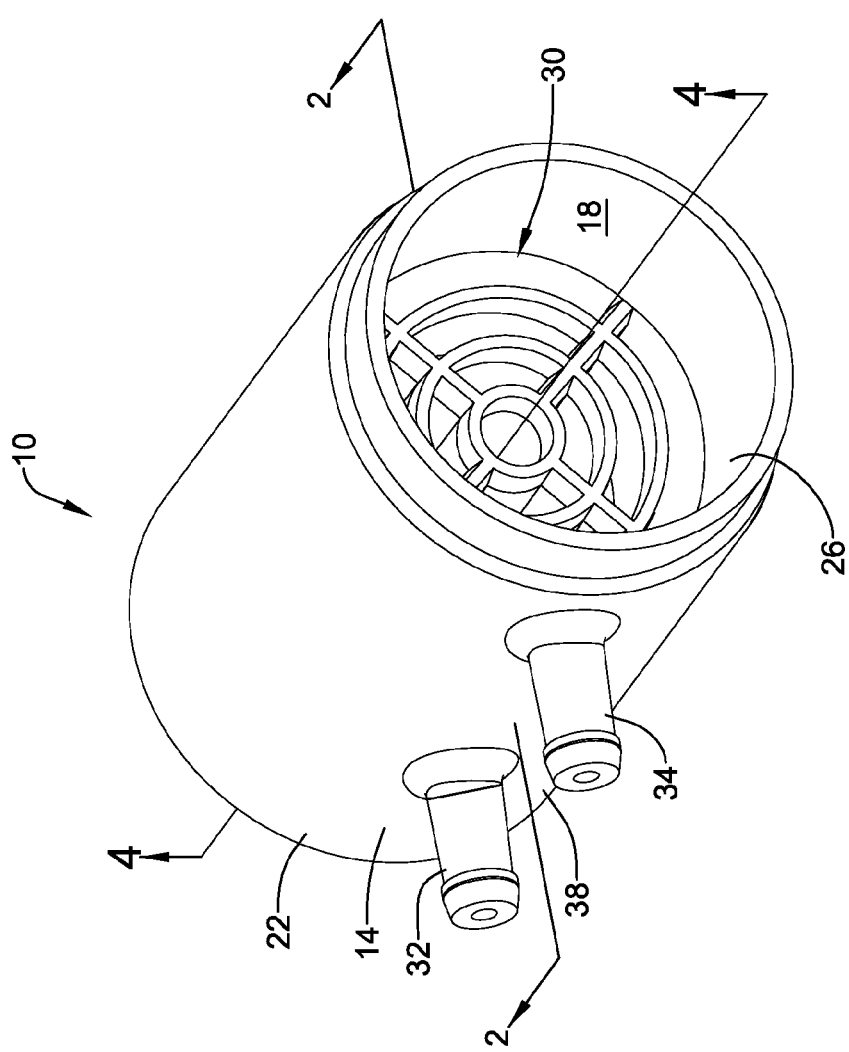
FIG. 1 is an isometric view of a flow module.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to be illustrative in nature.

FIG. 1 shows an exemplary flow module 10 that, when fluidly coupled to a sensor module (e.g. see FIG. 7), may be used to sense a measure related to a fluid flow such as for example, a fluid flow rate and/or a fluid pressure. In many cases, the flow module 10 of FIG. 1 may be used in low flow rate and/or low pressure applications.

The illustrative flow module 10 includes a housing 14 defining a flow channel 18 into which an entering fluid may flow from a flow system via an inlet end 22, with the fluid exiting the flow channel 18 at an outlet end 26. The flow channel 18 may have a cross-sectional shape and size compatible with that of existing flow systems that may facilitate its connections to various apparatuses including ventilators, respirators, continuous positive air pressure (CPAP) machines and/or the like, but not limited to these. Other diameters and varying diameters may be used, and/or other shapes may be used. In some cases, and to help ensure that the flow module is calibrated to measure an accurate flow rate and/or pressure of the fluid, and to maintain the flow rate at the outlet end 26 at substantially the same rate as at the inlet end 22, the flow channel 18 may be designed to have substantially the same cross-sectional shape and size along its longitudinal axis.

Figure 4:
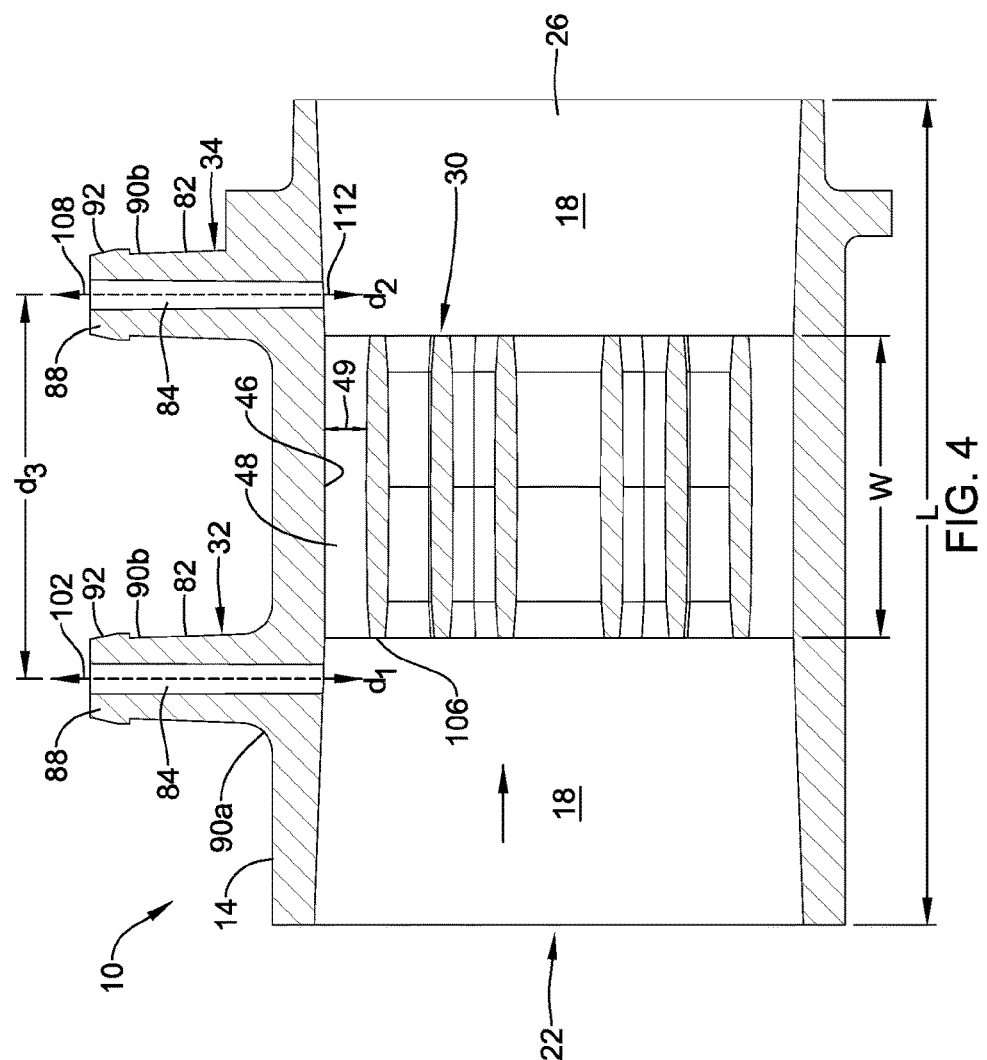
FIG. 4 is a side, cross-sectional view of the flow module shown in FIG. 1 taken along line 4-4.

In many cases, the flow module 10 may include an integrated or non-integrated flow restrictor 30 disposed within the flow channel 18. Also, first and second sensing ports 32, 34 may extend away from an outer surface 38 of the housing 14. The first and second ports 32, 34 may be in fluid communication with the flow channel 18, as best shown in FIG. 4. The first and second ports 32, 34 may be positioned on the housing 14 relative to the flow restrictor 30 such that the first port 32 is located on an inlet side of the housing 14 relative to flow restrictor 30, and the second port 34 is located on an outlet side of the housing 14 relative to the flow restrictor 30. In some cases, the housing 14 together with the flow restrictor 30 and the first and second ports 32, 34 are molded together as a unitary, one-piece integrated flow module 10. In one example, the unitary, one-piece integrated flow module 10 may be injection molded.

In the example shown, the flow restrictor 30 creates a pressure drop across the flow restrictor that is dependent on the flow rate of the fluid traveling through the flow channel 18. This, in turn, results in a pressure difference between the first and second ports 32, 34. The pressure differential created by the flow restrictor 30 may, in some cases, facilitate a relatively small fluid flow from the fluid channel and to a sensing module (not shown in FIG. 1) via the first and second ports 32, 34. The pressure differential created between the first and second ports 32, 34 is dependent on the geometry of the flow restrictor 30, and increases with flow rate.

The fluid flowing through the flow channel 18 may have an increasingly turbulent flow as the flow rate of the fluid increases, i.e., an increasing non-uniform pressure and velocity across a given plane orthogonal to the direction of flow. To address this, the flow restrictor 30, in addition to creating a pressure drop, may be configured to straighten and laminarize the fluid flow in the flow channel 18, thereby reducing turbulence. The flow restrictor 30 may reduce turbulence by, for example, forcing the fluid to flow through a series of spaced orifices 40. The pressure drop across the flow restrictor 30 may also be dependent on the size and uniformity of these orifices 40. In some cases, two optional screens, an inlet screen and an outlet screen (not shown), sometimes formed of a honeycomb-patterned structure, may be positioned in the flow channel 18 upstream and downstream of the flow restrictor 30, respectively to further straighten and/or laminarize the fluid flow in the flow channel 18.

Figure 2:
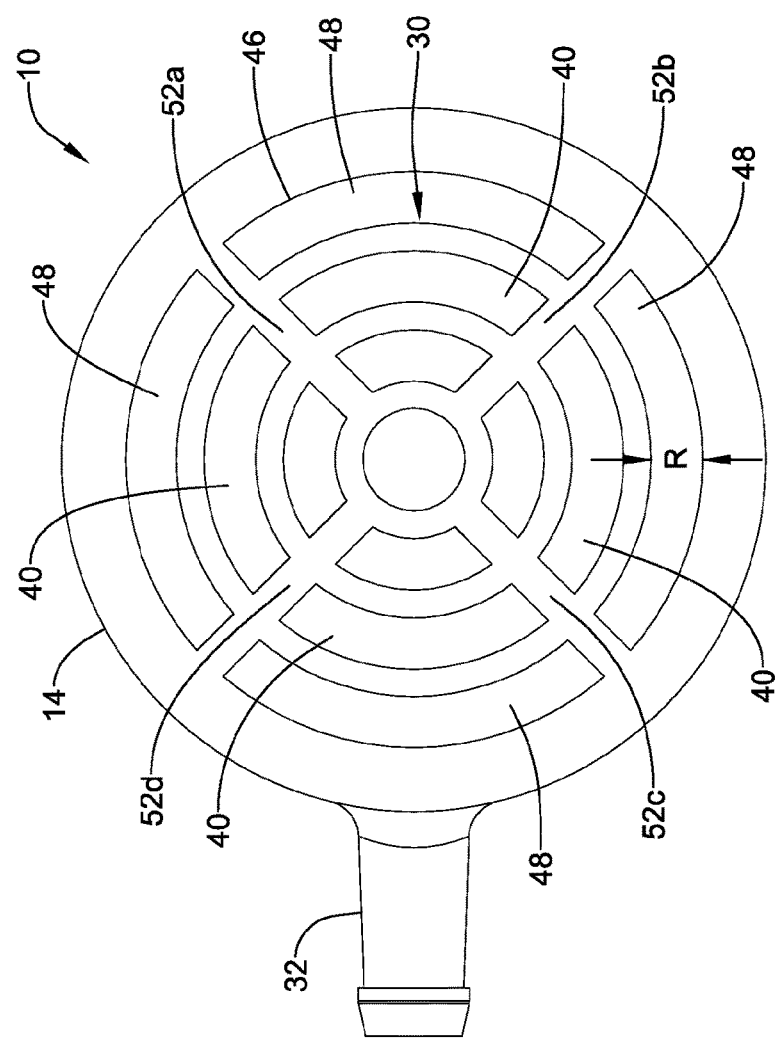
FIG. 2 is an end, cross-sectional view of the flow module shown in FIG. 1 taken along line 2-2.

FIG. 2 is a cross-sectional view of the flow module 10 shown in FIG. 1 taken along line 2-2, showing an illustrative flow restrictor 30 in greater detail. As shown in FIG. 2, the flow restrictor 30 can include orifices 40 that are circular and concentrically spaced about a central axis, which extends normal to FIG. 2. In many cases, the orifices 40 are circular to adapt the flow restrictor 30 to the shape of the walls defining the flow channel 18. This shape matching may provide a more uniform reduction of turbulence across the flow channel 18. In some cases, each orifice 60 may have a hydraulic radius, R, ranging from about 0.203 cm (0.080 inches) to about 0.292 cm (0.115 inches). In one example, each orifice 60 has a hydraulic radius, R, of about 0.274 cm (0.108 inches), but this is just one example.

In the example shown, each orifice 40 is disposed concentrically with each other, with the flow channel wall 46, and with the central axis. Moreover, the illustrative flow restrictor 30 has outer orifices 48 which are partially defined by the flow channel wall 46 and are uniform in shape and concentric with orifices 40. A number of support rods may extend radially across the flow restrictor 30 to provide additional support to the flow restrictor 30 disposed within the flow channel. In some cases, as shown in the example provided in FIG. 2, the flow restrictor 30 can have four main support rods 52a-52d extending radially across the flow restrictor 30. However, it will be generally understood that the flow restrictor 30 may include less or more support rods, as desired. However, if support rods are incorporated into the flow restrictor, it may be desirable for the orifices 40 to have a substantially identical or similar hydraulic diameter throughout and/or form a partially-repeating pattern in which the orifices 40 are symmetrically aligned about the central axis with other orifices of substantially the same hydraulic diameter so as to provide a substantially uniform flow velocity across the flow channel 18.

Figure 3:
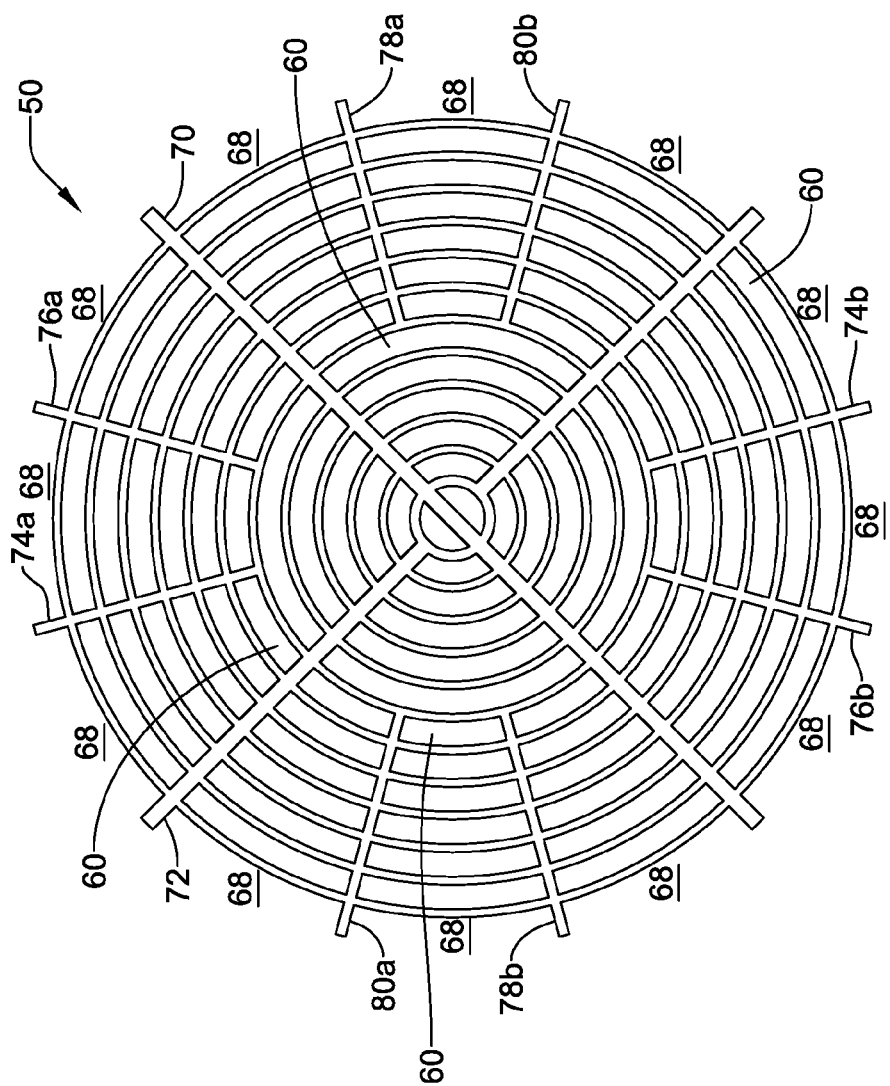
FIG. 3 is a front view of an exemplary flow restrictor that may be incorporated into a flow module such as shown in FIG. 1.

Another exemplary flow restrictor 50 is shown in FIG. 3. Flow restrictor 50 is somewhat similar to flow restrictor 30 described in detail with reference to FIG. 2 in that each of the flow restrictors 30, 50 include circular orifices that are circular and concentrically spaced about a central axis extending normal to the Figure. As shown in FIG. 3, the flow restrictor 50 includes two main support rods 70, 72 and numerous support pairs formed of two smaller support rods aligned radially with one another are used (shown as pairs 74a, 74b, 76a, 76b, 78a, 78b, and 80a, 80b). The support pairs 74a, 74b through 80a, 80b provide additional support to the flow restrictor 50, helping to prevent those portions of the orifices 60 between the main support rods from moving during higher flow rate usage, whereas without such support pairs, the flow restrictor 50 could move, or rattle, resulting in less reduction in turbulence of the fluid and more noise measured by a sensor such as for example, a flow rate sensor or pressure sensor. Thus, this rigidity may help reduce noise in the system thereby allowing the use of a higher sensitivity sensor. In the example shown, the support pairs are formed of these smaller support rods 74a, 74b through 80a, 80b, in such a way as to form identical, mirrored orifices on each side of the central axis along a given radial distance, with uniformity in orifice structure and diameter being desirable to help laminarizing the flow fluid across the flow channel 18. That is, by using the main support rods 70, 72 and support pairs 74a, 74b through 80a, 80b in this symmetrical way, any orifice 60 is symmetric with an identical orifice of equal hydraulic diameter. As is known, when the width of an opening is much greater than the distance (r) across the opening, the hydraulic diameter is approximately equal to 2r. The symmetrical and uniform hydraulic diameters of the orifices 60, 68 may help create uniform flow velocity through the flow channel 18.

It will be generally understood that the flow restrictors 30, 50 may include fewer or greater number of orifices than is shown in FIGS. 2 and 3. In addition, other geometries of orifices, adapted to any suitable cross-sectional shape and extending substantially parallel to the central axis of the flow channel 18 may be employed. These could have a uniform repeating pattern of orifices of substantially identical hydraulic diameter throughout or a partially-repeating pattern in which orifices are symmetrically aligned about the central axis with other orifices of substantially the same hydraulic diameter. Other variations are also contemplated.

The maintenance and/or increase in uniform flow velocity through the flow channel 18 having a flow restrictor 30, 50, as described herein, may contribute to an increase in the accuracy of any pressure or flow rate measurements measured using an appropriate sensor module coupled to the first and second ports of the flow module 10, particularly for low flow rate and/or low pressure applications.

As discussed above with reference to FIG. 1, the flow module 10 may include a first port 32 spaced apart from a second port 34, each of the ports 32, 34 extending away from an outer surface 38 of the housing 14 and in fluid communication with the flow channel 18. In the example shown, the first port 32 and the second port 34 may each have generally cylindrical body 82 defining a conduit 84 that is in fluid communication with the flow channel 18. In some cases, the cylindrical body 82 may have an outer diameter that decreases from a first end 90a to a second end 90b moving in a direction away from the outer surface 38 of the housing. In other cases, the cylindrical body 82 of each of the ports 32, 34 may be substantially constant from a first end 90a to a second end 90b. The accessible end 88 of each of the ports 32, 34 may be configured to be coupled to another apparatus including a sensing module for sensing a measure related to fluid flow such as for example, flow rate and/or pressure. In some cases, appropriate tubing such as for example, micro-tubing, can be used to place the flow module in fluid communication with a sensing module of another apparatus such as for example, a respirator, a ventilator or a CPAP machine. In other cases, the apparatus including the sensing module may include connectors configured to mate with the first and second ports 32, 34 of the flow module. As shown in FIG. 4, the pressure ports 32, 34 may include a barb or flange 92. The barb or flange 92 may facilitate the attachment and/or retention of tubing and/or the attachment and retention of another apparatus such as, for example, a sensor apparatus that is coupled to or in fluid communication with the flow module 10. In other cases, tubing such as micro-tubing may be connected to each of the first and second ports 32, 34 using a snug-fit, a slip-fit or other frictional fit. Depending on the overall size of the ports 32, 34 and the tubing, hose clamps may also be used to secure the tubing to the ports 32, 34, if desired.

As can be more clearly seen in FIG. 4, the first and second ports 32, 34 may be positioned relative to the flow restrictor 30 disposed within the flow channel 18 of the housing, such that the first port 32 is located on an inlet side 22 of the housing 14 relative to flow restrictor 30, and the second port 34 is located on an outlet side 26 of the housing 14 relative to the flow restrictor 30. The first and second ports 32, 34 may be located relative to the flow restrictor 30 (and also to each other) such that a steady differential pressure measured across the first and second ports 32, 34 can be achieved, thereby reducing the noise of the measurement. In general, the farther the first and second ports 32, 34 are located away from the flow restrictor 30 and also from each other, the steadier the differential pressure across the first and second ports 32, 34 becomes. However, the distance between each of the ports 32, 34 and the ports 32, 34 relative to the flow restrictor 30 may be limited by the overall length of the flow module housing 14. As a result, there is a balance between the distance between each of the ports 32, 34 relative to one another and the distance of each of the ports 32, 34 relative to the flow restrictor 30. In some cases, the first and second ports 32, 34, may be located as close as possible to their respective side of the flow restrictor 30 and consequently, to each other, while at the same time maintaining a steady differential pressure when measured across the first and second ports 32, 34. In some cases, the first and second ports 32, 34 may each be located an equal distance from their respective side, inlet side 22 or outlet side 26, of flow restrictor 30. For example, a distance, d1, between the first port 32 and the flow restrictor 30, may be measured from a centerline 102 extending through the first port 32 and an inlet edge 106 of the flow restrictor (see FIG. 4). Similarly, a distance, d2, between the second port 34 and the flow restrictor 30 may be measured from a centerline 108 extending through the second port 34 and an outlet edge 112 of the flow restrictor 30, where d1 is equal to d2. In some cases, the distances d1, d2 range from approximately 1.0 mm to approximately 3.0 mm; from approximately 1.0 mm to approximately 2.00; from approximately 1.25 mm to approximately 1.5 mm; and more typically may be about 1.35 mm.

The distance, d3, between the first and second ports 32, 34, may be measured between the centerline 102 of the first port 32 and the centerline 108 of the second port. In some cases, the distance d3 may range from approximately 7.0 mm to approximately 20.0 mm; from approximately 11.0 mm to approximately 18.0 mm; from approximately 12.0 mm to approximately 16.0 mm; from approximately 12.5 mm to approximately 14.0 mm; and more typically, the distance d3 is about 12.7 mm.

Because the flow module may be sized according to the desired application, the distances d1, d2, and d3 may also be described relative to the gap between concentric rings of the flow restrictor and the width of the flow restrictor. For example, in some cases, the distances d1, d2 range from about 50% of the gap "R" to about 200%; from about 75% of the gap "R" to about 150% of the gap; and more typically about 90% of the gap "R". The relative distances between d1, d2, and d3 may be dependent on a number of variables including the overall length of the flow module 10, the width and inlet shape of the flow restrictor 30, 50, the flow rate, and/or the desired application. Regardless of the overall size of the flow module, the first and second ports 32, 34 may be located relative to the flow restrictor 30 (and also to each other) such that a steady differential pressure measured across the first and second ports 32, 34, can be achieved.

In some cases, and as indicated above, the illustrative flow restrictor 30 may have outer orifices 48 that are partially defined by the flow channel wall 46. These outer orifices 48 may have an orifice height 49 defined in a direction perpendicular to the inwardly extending flow channel wall 46. In some cases, this orifice height 49 may correspond to the gap "R" between concentric rings discussed above. In any event, it is contemplated that the first port 32 may open into the flow channel 18 downstream of the inlet end 22 of the flow channel 18 and upstream of the inlet side 106 of the flow restrictor 30, 50, and the second port 34 may open into the flow channel 18 upstream of the outlet end 26 of the flow channel 18 and downstream of the outlet side of the flow restrictor 30, 50, wherein the distance d1 from the first port 32 to the inlet side 106 of the flow restrictor 30, 50 ranges from 50% to 200% of the orifice height 49. Likewise, the distance d2 from the second port 34 to the outlet side of the flow restrictor 30, 50 may range from 50% to 200% of the orifice height 49. In some cases, the distance d1 from the first port 32 to the inlet side 106 of the flow restrictor 30, 50 ranges from 90% to 150% of the orifice height 49, and/or the distance d2 from the second port 34 to the outlet side of the flow restrictor 30, 50 may range from 90% to 150% of the orifice height 49.

In some cases, the distance d1 from the first port 32 to an inlet side 106 of the flow restrictor 30, 50 is between 5% and 15% of a distance d3 between the first port 32 and the second port 34. In some cases, the distance d1 from the first port 32 to the inlet side 106 of the flow restrictor is between 1 mm and 3 mm, and the distance d3 between the first port 32 and the second port 34 is between 12 mm and 16 mm. In some cases, the distance d1 from the first port 32 to the inlet side 106 of the flow restrictor is between 1 mm and 2 mm, and the distance d3 between the first port 32 and the second port 34 is between 12.5 mm and 14 mm. In some cases, the distance d1 from the first port 32 to the inlet side 106 of the flow restrictor is between 1 mm and 2 mm, and the distance d3 between the first port 32 and the second port 34 is between 10 mm and 15 mm.

In some cases, depending upon the desired application, an overall length, L, of the flow module may range from about 20 mm to about 50 mm; from about 20 mm to about 40 mm; from about 20 mm to about 30 mm and in some cases, is about 27 mm. The width W of the flow restrictor 30, 50 may be any suitable width smaller than overall length L, and in some cases, ranges from about 35% to about 40% of the overall length L of the flow module 10. For example, in some cases, the width W of the flow restrictor 30, 50 may range from about 5.0 mm to about 15.0 mm, and more particularly from about 5.0 mm to about 12.0 mm. In some cases, the width W of the flow restrictor 30, 50 is about 10.0 mm.

Figure 5:
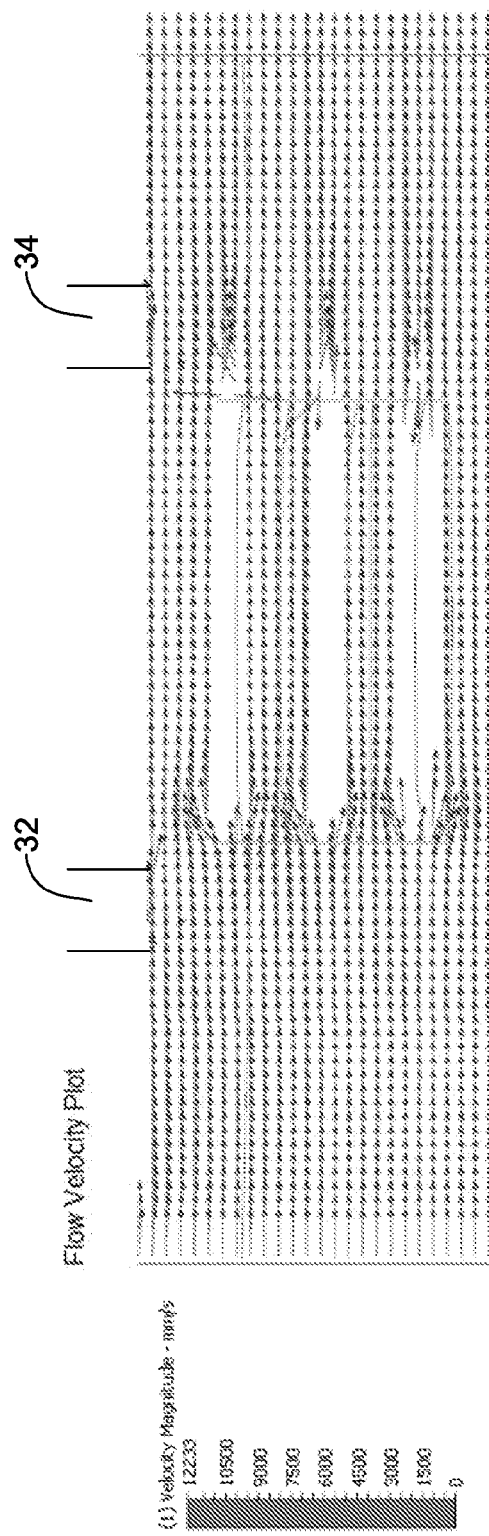
FIG. 5 is a flow velocity plot showing simulated flow velocity in the area of the ports.
Figure 6:
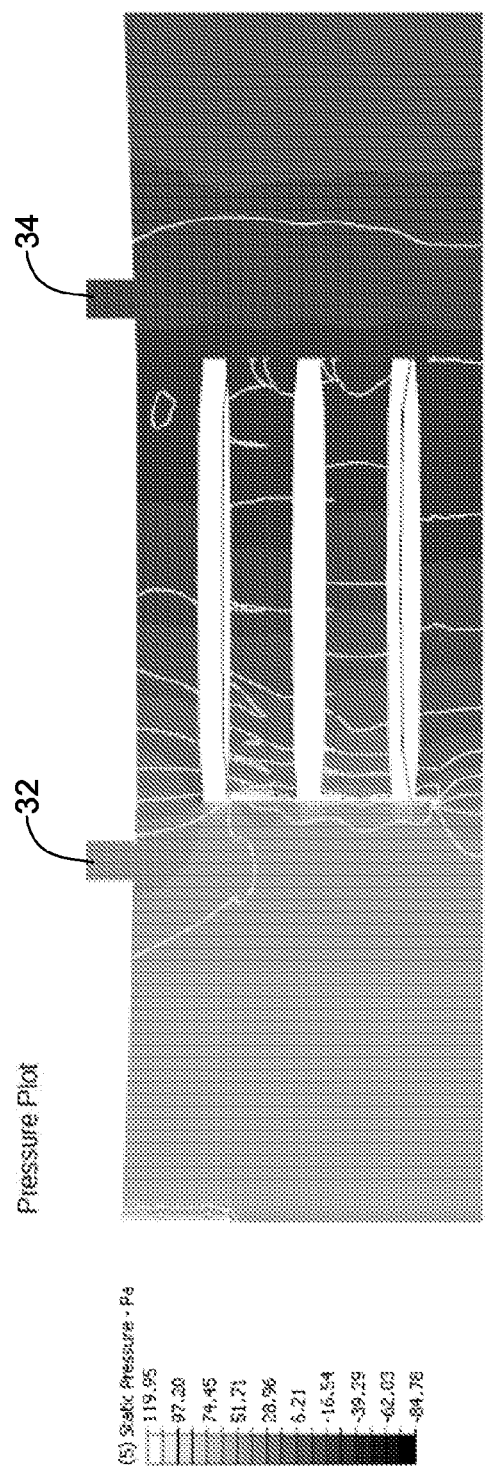
FIG. 6 is a pressure plot showing simulated pressure change in the area of the ports.

FIG. 5 is a flow velocity plot showing simulated flow velocity in the area of the ports 32, 34. FIG. 6 is a pressure plot showing simulated pressure change in area of the port 32, 34. As can be seen in FIG. 5, a minimal flow velocity change is exhibited in the area of the ports. Also, as can be seen in FIG. 6, a minimal pressure change is exhibited in the area of the ports.

While the flow module 10 as described herein may be used in low flow and/or low pressure applications, the flow restrictor 30 and/or the flow module 10 including the housing 14, flow restrictor 30 and first and second ports 32, 34 can be fabricated from a material strong enough to withstand high flow rates, such as over 6000 L/min, and can be formed from multiple pieces affixed together or from a single molded piece. In addition, the flow restrictor 30 may be formed from a temperature resistant material having a high modulus of elasticity. Furthermore, for use in applications such as anesthetizing apparatus where high concentrations of potentially corrosive and/or damaging chemicals are used or in medical applications generally where potentially damaging cleaning agents are used, the flow restrictor 30 can be made from a material that is chemically inert, resistant and/or non-reactive. Additionally, the walls of the flow restrictor 30, and more particularly the ribs defining the plurality of orifices, may be sufficiently thin so as to minimize turbulence.

In some cases, the flow restrictor 30 and or the flow module 10 including the housing 14, flow restrictor 30 and first and second ports 32, 34 may be made of a nylon resin. Nylon resins may be processed by injection molding, foam molding or extrusion techniques, and demonstrate minimal creep defects under high load. Therefore, the use of a nylon resin may allow the flow restrictor 30 to be easily manufactured, and to achieve very long useful lifetimes under heavy load conditions. In particular, nylon resins have demonstrated to be more manufacturable than other materials because of their ability to uniformly fill all intricate details of the mold used to form the flow restrictor 30 and/or the integrated flow module 10 including the housing 14, the flow restrictor 30 and the first and second ports 32, 34, before hardening into the final structure. In some cases, the flow restrictor 30 and or the flow module 10 including the housing 14, flow restrictor 30 and first and second ports 32, 34 may be made of a nylon 6/6 resin such as, for example, RTP 201™ resin available from RTP Corporation of Illinois. The RTP 201™ resin with 10% glass fill has a tensile strength of approximately 14,000 psi and an elastic modulus of approximately 700,000 psi. Those of ordinary skill in the art will appreciate that other materials can be used to form the flow restrictor 30 and/or the integrated flow module 10 including the housing 14, the flow restrictor 30 and the first and second ports 32, 34. For example, a polyetherimide resin such as an Ultem® 2210 resin with 20% glass by weight, available from General Electric Co., also could be used to manufacture the flow restrictor 30 and/or the integrated flow module 10 including the housing 14, the flow restrictor 30 and the first and second ports 32, 34. This polyetherimide resin forms a material more amorphous than semi-crystalline plastics which produce non-uniform shrinkage in the mold causing slightly warped structures. In addition, the flow restrictor 30 may be formed of various metals, plastics, resins, ceramics, or liquid crystal polymers (LCPS) which exhibit similar properties as those materials discussed above. Examples of polycarbonate materials that may be used to manufacture the flow restrictor 30 include MAK-ROLON® 2458 (available from Bayer Materials Science) and LEXAN™ HP1 (available from SABIC Innovative Plastics).

As described herein, the flow module 10 may be fluidly coupled to a sensor module. The sensor module may include one or more sensing elements such as a pressure sensor, a thermal sensor and/or a flow rate sensor. In some cases, microtubing may be used to couple the flow module 10 to the sensor module. For example, a first tubing may connect the first port 32 to an inlet side of a sensor module and a second tubing may connect the second port 34 to an outlet side of the sensor module. The sensor module may measure, for example, the pressure differential between the first and second ports 32, 34, where the pressure differential may be indicative of a flow rate of a fluid flowing within the flow channel 18 of the flow module. In some cases, the sensor module may include a flow sensor that is configured to measure a flow of fluid flowing from the flow channel 18, through the first port 32, through tubing to the sensor module, over the flow sensor, out of the sensor module to tubing that is connected to the second port 32, and back into the fluid channel 18. Such a flow sensor is shown in FIG. 7.

Figure 7:
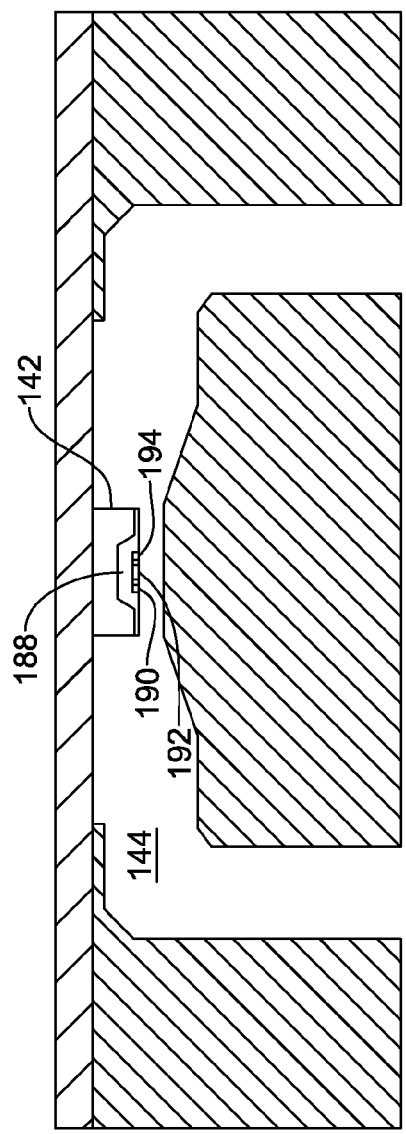
FIG. 7 is a schematic view of an exemplary sensor module that may be fluidly coupled to a flow module, such as the flow module of FIG. 1.

FIG. 7 is a schematic view of an exemplary sensor module including a sensor 142 that may be fluidly coupled to a flow module 10, as described herein. In one example, as a microbridge structure, the sensor 142 may include a microchannel 188 that defines an air space into which some of the fluid flowing into the sensing channel 144 will flow, in the direction indicated. The fluid will flow across an upstream sensor 190, a heater 192, and a downstream sensor 194. In principle, the heater 192 may be heated to approximately 160° C. above ambient temperature via the application of a current to the heater 192. Under no flow conditions, the upstream sensor 190 and the downstream sensor 194 would both read the same temperature due to the heater 192, i.e., both sensors would have the same measured resistance values because both are equally-spaced from the heater 192. The resistance values of the sensors 190, 194 may be measured from the application of a constant current to a resistive wire or pattern having a high thermal coefficient of resistivity that forms the sensors 190, 194. As the fluid enters the flow channel 18, a portion thereof enters the sensing channel 144 with an even smaller portion thereof enters the microchannel 188, creating a flow path across the top and bottom surfaces of the heater 192 and sensors 190, 194. The flow of the fluid moves heat produced by the heater 192 away from the upstream sensor 190 and towards the downstream sensor 194, resulting in a reduction of temperature of the former and an increase in temperature in the latter. The change in temperatures produces a corresponding change in the resistance values of each of the sensors. The difference between the resistance values for the two sensors 190, 194 is measured by circuitry (not shown) and used to determine the flow rate of the fluid in the sensing channel 144 from which the flow rate of the fluid in channel 18 can be determined.

In some cases, rather than providing a flow sensor, it is contemplated that a differential pressure sensor may be provided in the sensing channel 144. The differential pressure sensor may sense the differential pressure created between the first and second ports 32 by the fluid flowing through the restrictor 30, 50. A flow rate of the fluid in channel 18 can then be determined therefrom. In some cases, the sensing module may include other sensors, such as a temperature sensor, a thermal conductivity sensor, etc., which may be used to help calibrate and/or correlate the sensed parameter (e.g. fluid flow and/or differential pressure) with the flow rate of the fluid in the fluid channel 18.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A flow system comprising:
    a sensor module;
    a flow module fluidly coupled to the sensor module, the flow module comprising:
        a housing defining a flow channel having an inlet end and an outlet end, the flow channel defined by an inwardly facing flow channel wall extending between the inlet end and the outlet end;
        a flow restrictor within the flow channel, the flow restrictor having an inlet side and an outlet side and a plurality of orifices extending from the inlet side to the outlet side, with at least one of the plurality of orifices extending along the inwardly facing flow channel wall of the housing and having an orifice height in a direction perpendicular to the inwardly extending flow channel wall; and
        first and second ports in fluid communication with the flow channel, the first port opening into the flow channel downstream of the inlet end of the flow channel and upstream of the inlet side of the flow restrictor and the second port opening into the flow channel upstream of the outlet end of the flow channel and downstream of the outlet side of the flow restrictor, wherein a distance from the first port to the inlet side of the flow restrictor ranges from 50% to 200% of the orifice height.

2. The flow system according to claim 1, wherein each of the first and second ports is located an equal distance from the inlet side of the flow restrictor and the outlet end of the flow restrictor, respectively.

3. The flow system according to claim 1, wherein the distance from the first port to an inlet side of the flow restrictor is between 5% and 15% of a distance between the first port and the second port.

4. The flow system according to claim 1, wherein the distance from the first port to an inlet side of the flow restrictor is between 1 mm and 2 mm, and the distance between the first and second ports is between 10 mm and 15 mm.

5. The flow system according to claim 1, wherein the sensor module comprises a pressure sensor.

6. The flow system according to claim 1, wherein the sensor module comprises a flow sensor.

7. The flow system according to claim 1, wherein the distance from the first port to the inlet side of the flow restrictor ranges from 90% to 150% of the orifice height.

8. The flow system according to claim 1, wherein the plurality of orifices follow a contour of the flow channel, wherein the plurality of orifices are aligned concentrically about a central axis of the flow restrictor.

9. The flow system according to claim 1, wherein the flow channel has a cylindrical shape.

10. The flow system of claim 1, wherein the flow module, including the housing, the flow restrictor and the first and second ports, comprises a unitary, single body.

11. A flow module comprising:
    a housing having a wall defining a flow channel, wherein the flow channel has an inlet end and an outlet end;
    a flow restrictor in the flow channel, the flow restrictor having an inlet edge and an outlet edge and a plurality of orifices extending between the inlet edge and the outlet edge; and
    first and second ports in fluid communication with the flow channel, the first port opening into the flow channel downstream of the inlet end of the flow channel and upstream of the inlet edge of the flow restrictor and the second port opening into the flow channel upstream of the outlet end of the flow channel and downstream of the outlet edge of the flow restrictor, wherein a distance from the first port to the inlet edge of the flow restrictor ranges from 1.0 mm to 3.0 mm and a distance between the first port and the second port ranges from 12.0 mm to 16.0 mm.

12. The flow module according to claim 11, wherein each of the first port and second port is located an equal distance from the inlet edge and the outlet edge of the flow restrictor, respectively.

13. The flow module according to claim 11, wherein the distance from the first port to the inlet edge of the flow restrictor is between 1 mm and 2 mm, and the distance between the first port and the second ports is between 12.5 mm and 14 mm.

14. The flow module of claim 11, wherein the flow module, including the housing, the flow restrictor, and the first and second ports, comprises a unitary, single body.

15. The flow module of claim 11, wherein the plurality of orifices are circular and concentrically spaced about a central axis and wherein the plurality of orifices produce a substantially uniform flow across the flow channel at the outlet end.

16. The flow module of claim 15, further comprising a sensing module fluidly coupled to the first port and the second port.

17. A method of sensing a measure related to fluid flow comprising:
    receiving a fluid flow through a flow channel of a flow module, the flow module comprising a housing defining the flow channel having an inlet end and an outlet end, a flow restrictor within the flow channel, the flow restrictor having an inlet side and an outlet side and comprising a plurality of orifices following a contour of the flow channel, wherein the orifices are aligned concentrically about a central axis of the flow restrictor, and first and second ports in fluid communication with the flow channel, the first port located on an inlet side of the housing relative to the flow restrictor and the second port located on an outlet side of the housing relative to the flow restrictor, wherein a distance from the first port to the inlet side of the flow restrictor ranges from 50% to 200% of a height of an outer concentric orifice of the plurality of orifices; and determining a measure related to fluid flow in the fluid channel using a differential pressure created between the first and second ports.

18. The method of claim 17, further comprising determining a fluid flow rate using the differential pressure between the first and second ports.

19. The method of claim 17, wherein the determining step includes measuring a differential pressure between the first and second ports.

20. The method of claim 17, wherein the determining step includes measuring a flow rate of a fluid flowing between the first and second ports, the flow rate being dependent upon the differential pressure between the first and second ports.

* * * * *